United States Patent [19]

Ho et al.

[11] Patent Number: 5,670,052
[45] Date of Patent: Sep. 23, 1997

[54] SEPARATING AROMATICS FROM NON-AROMATICS BY POLYIMIDE-POLYESTER MEMBRANE

[75] Inventors: Win-Sow Winston Ho; Guido Sartori, both of Annandale; Warren A. Thaler, Flemington; David C. Dalrymple, Bloomsbury, all of N.J.

[73] Assignee: Exxon Research & Engineering Company, Florham Park, N.J.

[21] Appl. No.: 688,321

[22] Filed: Jul. 30, 1996

Related U.S. Application Data

[62] Division of Ser. No. 560,243, Nov. 21, 1995, Pat. No. 5,550,199, which is a continuation of Ser. No. 348,426, Dec. 2, 1994, abandoned.

[51] Int. Cl.⁶ .................... B01D 61/36; C08G 59/22; C08G 73/10
[52] U.S. Cl. .................... 210/651; 525/423
[58] Field of Search .................... 525/423, 640, 525/651

[56] References Cited

U.S. PATENT DOCUMENTS

| | | | |
|---|---|---|---|
| 4,741,939 | 5/1988 | Marchetti et al. | 428/423.5 |
| 4,830,819 | 5/1989 | Sakuramoto et al. | 156/331.1 |
| 4,880,895 | 11/1989 | Higashi et al. | 528/125 |
| 4,944,880 | 7/1990 | Ho et al. | 210/640 |
| 5,133,989 | 7/1992 | Numata et al. | 428/458 |
| 5,230,801 | 7/1993 | Darnell et al. | 210/640 |
| 5,241,039 | 8/1993 | Ho et al. | 528/272 |
| 5,254,795 | 10/1993 | Boucher et al. | 210/651 |

FOREIGN PATENT DOCUMENTS

| | | |
|---|---|---|
| 56-69615 | 6/1981 | Japan . |
| 60-229929 | 11/1985 | Japan . |
| 63-283704 | 11/1988 | Japan . |
| 3-177472 | 1/1991 | Japan . |

*Primary Examiner*—Robert E. Sellers
*Attorney, Agent, or Firm*—Ronald D. Hantman

[57] ABSTRACT

A copolymer composition comprising the hard segment of a polyimide, the soft segment of an oligomeric aliphatic polyester, and a diepoxide for crosslinking and esterification. The diepoxide polyimide copolymer membranes have exhibited high selectivity and flux for separation of an aromatic/saturate mixture. These membranes have shown much better stability in soaking with an aromatic/saturate feed than the copolymer membranes without a diepoxide.

9 Claims, 6 Drawing Sheets

SEPARATING AROMATICS FROM NON-AROMATICS BY POLYIMIDE-POLYESTER MEMBRANE

This is a division of application Ser. No. 08/560,243, filed Nov. 21, 1995, now U.S. Pat. No. 5,550,199, which is a continuation of application Ser. No. 08/348,426, filed Dec. 2, 1994, now abandoned.

FIELD OF THE INVENTION

BACKGROUND

The use of membranes to separate aromatics from saturates has long been pursued by the scientific and industrial community and is the subject of numerous patents.

U.S. Pat. No. 3,370,102 describes a general process for separating a feed into a permeate stream and a retentate stream and utilizes a sweep liquid to remove the permeate from the face of the membrane to thereby maintain the concentration gradient drive force. The process can be used to separate a wide variety of mixtures including various petroleum fractions, naphthas, oils, hydrocarbon mixtures. Expressly recited is the separation of aromatics from kerosene.

U.S. Pat. No. 2,958,656 teaches the separation of hydrocarbons by type, i.e., aromatic, unsaturated, and saturated, by permeating a portion of the mixture through a non-porous cellulose ether membrane and removing permeate from the permeate side of the membrane using a sweep gas or liquid. Feeds include hydrocarbon mixtures, e.g., naphtha (including virgin naphtha, naphtha from thermal or catalytic cracking, etc.).

U.S. Pat. No. 2,930,754 teaches a method for separating hydrocarbons, e.g., aromatic and/or olefinic, from gasoline-boiling range mixtures by the selective permeation of the aromatic through certain non-porous cellulose ester membranes. The permeated hydrocarbons are continuously removed from the permeate zone using a sweep gas or liquid.

U.S. Pat. No 4,115,465 teaches the use of polyurethane membranes to selectively separate aromatics from saturates via pervaporation. U.S. Pat. Nos. 5,028,685 and 5,093,003 disclose halogenated polyurethanes and membranes therefrom for separating aromatics from saturates.

U.S. Pat. No. 4,944,880 and 4,990,275 describe polyimide/aliphatic polyester copolymers and membranes therefrom for the separation of aromatics from saturates. U.S. Pat. Nos. 4,946,594 and 4,997,906 describe crosslinked copolymers of aliphatic polyester diols and dianhydrides and membranes therefrom for the separation of aromatics from saturates.

U.S. Pat. No. 4,976,868 discloses the use of polyester membranes (e.g., polyethylene terephthalate, polybutylene terephthalate, and polyethylene terephthalate/cyclohexane-dimethanol terephthalate) for aromatics/saturates separation. U.S. Pat. Nos. 5,012,036, 5,012,035 and 5,019,666 teach the use of polyarylate, polyphthalatecarbonate, and non-porous polycarbonate membranes, respectively, to separate aromatics from saturates. U.S. Pat. No. 5,055,631 discloses sulfonated polysulfone membranes for the separation of aromatics from saturates. U.S. Pat. Nos. 5,128,439 and 5,177,296 describe saturated polyesters and crosslinked membranes therefrom for aromatics/saturates separation.

U.S. Pat. Nos. 5,139,023 and 5,180,496 describe unsaturated polyesters and crosslinked membranes therefrom for aromatics/saturates separation.

The present invention describes new diepoxide-crosslinked, esterified polyimide-aliphatic polyester copolymers, prepared from an aliphatic polyester diol, an anhydride, a diamine and a diepoxide.

In addition, the invention describes the preparation of thin membranes from the above copolymers and their use in the separation of aromatics from non-aromatics.

SUMMARY OF THE INVENTION

The present invention includes new, diepoxide-crosslinked/esterified polyimide-aliphatic polyester copolymers and their synthesis from an aliphatic polyester diol, an anhydride, a diamine, and a diepoxide. The invention also includes the preparation of membranes consisting of the above crosslinked copolymers and their use for aromatics/saturates separation.

DESCRIPTION OF THE PREFERRED EMBODIMENT

Figure 1A:
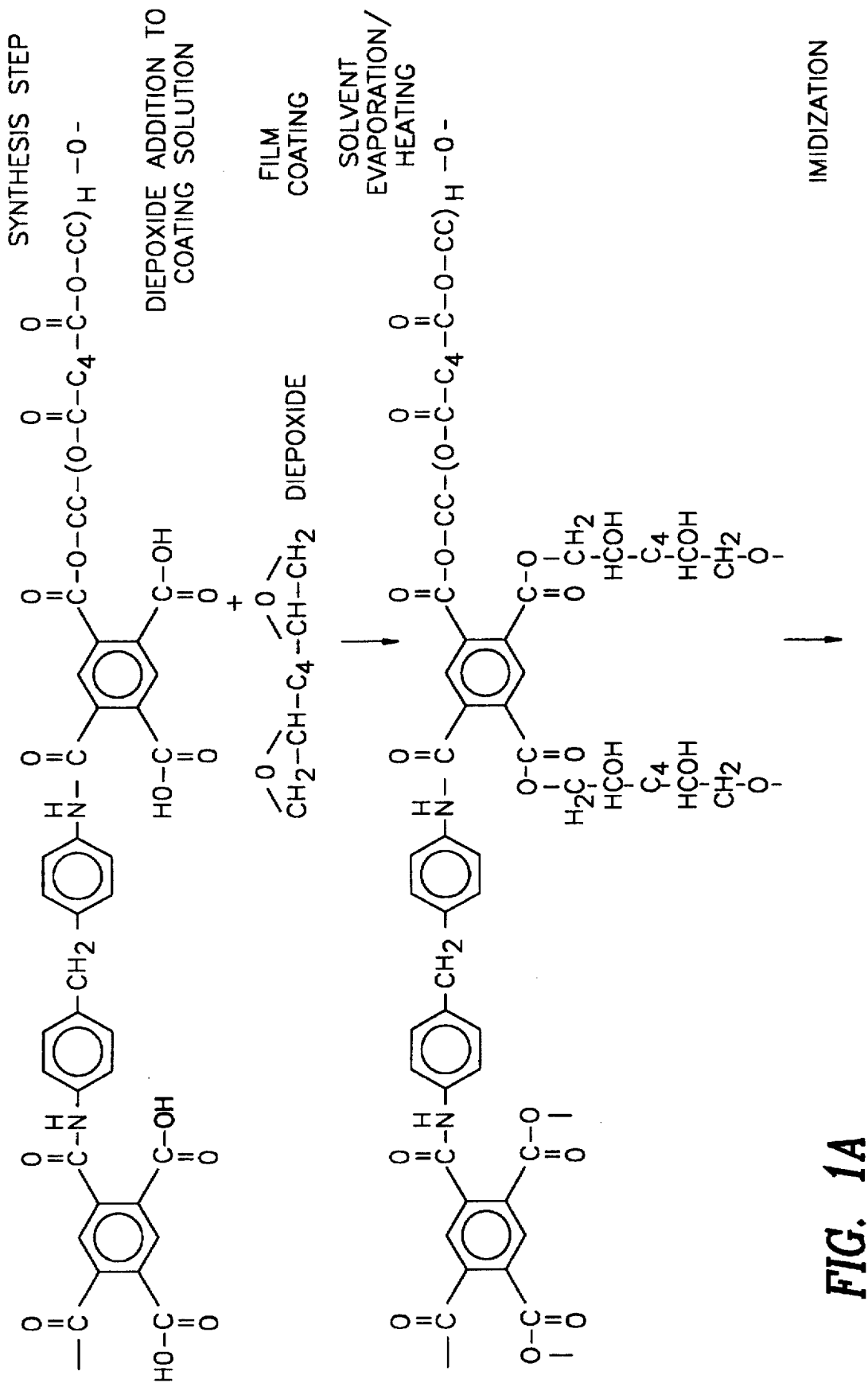
FIG. 1 Shows how a polyamic acid-polyester copolymer (PEI) is reacted with a diepoxide, followed by film casting, solvent evaporation and imidization.
Figure 1B:
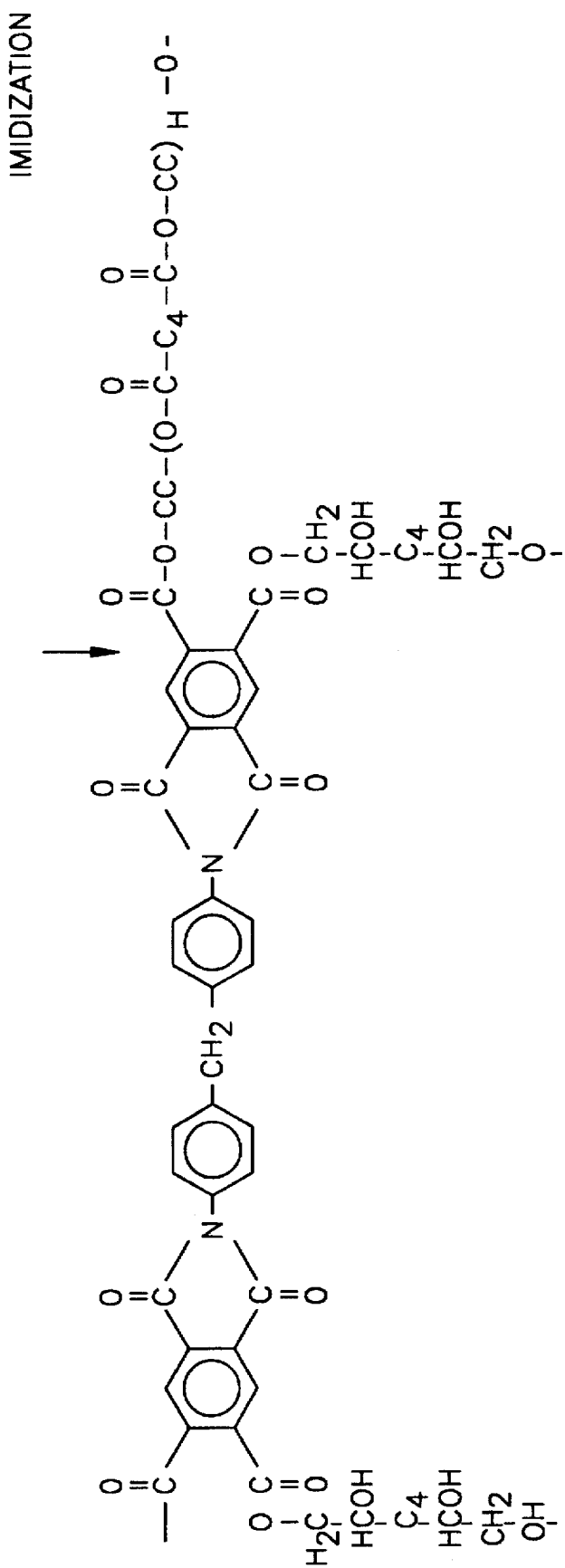

New diepoxide crosslinked/esterified polyimide-aliphatic polyester copolymers have been synthesized from an oligomeric aliphatic polyester diol, an anhydride, a diamine, and a diepoxide. To illustrate the synthesis and composition of the new copolymers, a diepoxyoctane crosslinked/esterified polyimide-polyadipate copolymer (diepoxyoctane PEI) membrane is used as an example. In the synthesis, one mole of polyethyleneadipate (PEA) diol is reacted with two moles of pyromellitic dianhydride (PMDA) to make a prepolymer in the end-capping step. The prepolymer is dissolved in a suitable solvent such as dimethyl formamide (DMF). In the DMF solution, one mole of the prepolymer reacts with one mole of methylene dianiline (MDA) to make a copolymer containing polyamic acid hard segment and PEA soft segment in the chain-extension step. The schematic of the polymer is shown in the upper portion of FIG. 1. As shown in this figure, diepoxyoctane is added to the copolymer-DMF solution at a diepoxide/PEA molar ratio of 2. The new copolymer membrane can be prepared by casting (film coating) the solution onto a porous support (e.g., porous Gore-tex teflon) or a glass plate, adjusting the thickness by means of a casting knife, drying the membrane first at a suitable temperature (e.g., room temperature) to remove most of the solvent (solvent evaporation), and heating at 120° C. to have the reaction of the diepoxide with pendent carboxylic acid groups. Finally, curing of the membrane at an elevated temperature, e.g., 320° C., for a suitable amount of time, e.g., 90 minutes, results in the diepoxide crosslinked/esterified polyimide-polyadipate copolymer membrane. The curing step converts the polyamide-ester hard segment to the polyimide hard segment via the imide ring closure with the release of alcohol.

In the synthesis with PEA, PMDA, MDA and diepoxide at a molar ratio of 1/2/1/2, the degree of crosslinking for pendent carboxylic acid groups adjacent to the ester linkages between polyimide hard segments and polyester soft segments is 50%. The amount of the diepoxide used in the crosslinking is 25%. The amounts of the diepoxide resulting in ester alcohol and free alcohol are 50% and 25%, respectively.

A polysuccinate diol, a polymalonate diol, a polyoxalate diol or a polyglutarate diol can be used instead of a polyadipate diol. The dianhydride is preferred to be an aromatic compound. Non-limiting examples include pyromellitic dianhydride, 3,3',4,4'-benzophenone tetracarboxylic dianhydide 4,4' (hexafluorisopropylidene)-bis(phthalic anhydride), 4,4'-oxydi(phthalic anhydride), and 3,3',4,4'-biphenyltetracarboxylic dianhydride, diphenylsulfone-3,3', 4,4'-tetracarboxylic dianhydride. Non-limiting examples of diamine include phenylene diamine, methylene dianiline (MDA), methylene di-o-chloroaniline (MOCA), methylene bis (dichloroaniline), methylene dicyclohexylamine, methylene dichlorocyclohexylamine, methylene bis (dichlorocyclohexylamine), 4,4'-(hexafluoroisopropylidene) -bisaniline (6F diamine), 3,3'-diaminodiphenyl sulfone, 4,4'-diaminodiphenyl sulfone, 4,4'-dimethyl-3,3'-diaminodiphenyl sulfone, 2,4-diamino cumene, methylene-bis(di-o-toluidine), oxydianiline, bisaniline A, bisaniline M, bisaniline P, thiodianiline, 2,2 bis[4 (4-aminophenoxy) phenyl] propane, [4-bis(4-aminophenoxy phenyl) sulfone, 4,4'-bis(4-aminophenoxy) biphenyl, 1,4-bis(4-aminophenoxy)benzene and 1,3-bis(4-aminophenoxy) benzene. Instead of diepoxyoctane, diepoxycyclooctane, diepoxybutane, bisphenol-A diglycidyl ether, or 1,4- butanediol diglycidyl ether can be used.

The crosslinked copolymers of the invention can be used for the preparation of membranes. The membranes are useful for the separation of aromatics, including sulfur and nitrogen heteroatom cyclic compounds, from saturates in petroleum and chemical streams, and have been found to be particularly useful for the separation of large substituted aromatics from saturates as are encountered in heavy catalytic naphtha streams boiling at 140° C.–235° C. Other streams which are also suitable feed streams for aromatics/saturates separation are intermediate catalytic naphtha streams boiling at 93° C.–160° C., light aromatics content streams boiling in the 40° C.–150° C. range, light catalytic cycle oil boiling in the 200° C.–345° C. range, jet fuel boiling in the 140° C.–280° C. range, diesel boiling in the 200° C.–365° C. range as well as streams in chemical plants which contain recoverable quantities of benzene, toluene, xylenes (BTX) or other aromatics in combination with saturates. Combinations of above streams are also suitable feed streams. Examples of sulfur-containing aromatics are thiophene, benzothiophene, dibenzothiophene and their alkyl derivatives. Examples of nitrogen-containing aromatics are aniline, pyridine, quinolines, acridine, 7,8- benzoquinoline and their alkyl derivatives. The separation techniques which may successfully employ the membranes of the present invention include perstraction and pervaporation.

Perstraction involves the selective dissolution of particular components contained in a mixture into the membrane, the diffusion of those components through the membrane, and the removal of the diffused components from the downstream side of the membrane by the use of a liquid sweep stream. In the perstractive separation of aromatics from saturates in petroleum or chemical streams, the aromatic molecules present in the feed stream dissolve into the membrane film more easily than the saturates, due to similarities between the membrane solubility parameter and those of the aromatic species in the feed. The aromatics then permeate (diffuse) through the membrane and are swept away by a sweep liquid which is low in aromatics content. This keeps the concentration of aromatics at the permeate side of the membrane film low and maintains the concentration gradient which is responsible for the permeation of the aromatics through the membrane.

The sweep liquid is low in aromatics content so as not to itself decrease the concentration gradient. The sweep liquid is preferably a saturated hydrocarbon liquid with a boiling point much lower or much higher than that of the permeate aromatics. This is to facilitate separation, as by simple distillation. Suitable sweep liquids, therefore, would include, for example $C_3$ to $C_6$ saturated hydrocarbons and lube base stocks ($C_{15}$–$C_{20}$).

The perstraction process is run at any convenient temperature preferably as low as possible.

The choice of pressure is not critical since the perstraction process is not dependent on pressure, but on the ability of the aromatic components in the feed to dissolve into and migrate through the membrane under a concentration driving force. Consequently, any convenient pressure may be employed, the lower the better to avoid undesirable compaction, if the membrane is supported on a porous backing, or rupture of the membrane, if it is not. If $C_3$ or $C_4$ sweep liquids are used at 25° C. or above in liquid state, the pressure must be increased to keep them in the liquid phase.

Pervaporation, by comparison, is run at generally higher temperatures than perstraction and relies on vacuum on the permeate side to evaporate the permeate from the surface of the membrane and maintain the concentration gradient driving force which drives the separation process. As in petstraction, the aromatic molecules present in the feed dissolve into the membrane film, migrate through said film and emerge on the permeate side under the influence of a concentration gradient. Pervaporation separation of aromatics from saturates can be performed at a temperature of about 25° C. for the separation of benzene from hexane but for separation of heavier aromatics/saturate mixtures, such as heavy catalytic naphtha, higher temperatures of at least 80° C. and higher, preferably at least 100° C. and higher, more preferably at least 120° C. have been successfully used with membranes prepared from the copolymers of this invention, the maximum upper limit being that temperature at which the membrane is physically damaged. Vacuum on the order of 1–80 mm Hg is pulled on the permeate side. The vacuum stream containing the permeate is cooled to condense out the highly aromatic permeate. Condensation temperature should be below the dew point of the permeate at a given vacuum level. Instead of vacuum, a sweep gas may also be used in the permeate side.

The membrane itself may be in any convenient form utilizing any convenient module design. Thus, sheets of membrane material may be used in spiral-wound or plate-and-frame permeation cells modules. Tubes and hollow fibers of membranes may be used in bundled configuration with either the feed or the sweep liquid (or vacuum) in the internal space of the tube or fiber, the other material obviously being on the other side.

When the membrane is used in a hollow fiber configuration with the feed introduced on the exterior side of the fiber, the sweep liquid flows on the inside of the hollow fiber to sweep away the permeated highly aromatic species, thereby maintaining the desired concentration gradient. The sweep liquid, along with the aromatics contained therein, is passed to separation means, typically distillation means, however, if a sweep liquid of low enough molecular weight is used, such as liquefied propane or butane, the sweep liquid can be permitted to simply evaporate, the liquid aromatics being recovered and the gaseous propane or butane (for example) being recovered and reliquefied by application of pressure or lowering of temperature.

We have evaluated the membranes to separate a mixture containing mesitylene and n-decane in a pervaporation apparatus. The initial mixture contains about equal weights of the two hydrocarbons. The pervaporation apparatus is a cell separated into two compartments by a porous metal plate, on which the membrane is supported. During a pervaporation experiment, the mesitylene-n-decane mixture is circulated through the upper compartment at the desired temperature. The lower compartment is kept at reduced pressure. The permeate is collected in a trap cooled with dry ice-acetone or isopropanol and periodically analyzed by gas chromatography.

The invention is illustrated further by the following examples, which, however, are not to be taken as limiting in any respect. All parts and percentages, unless expressly stated to be otherwise, are by weight.

EXAMPLE 1

Synthesis of Diepoxycyclooctane Crosslinked/Esterified Polyimide-Polyadipate Copolymer (Diepoxycyclooctane PEI) Membrane To 1.09 g (0.005 mole) of pyromellitic dianhydride (PMDA) in a 500 ml, 4-neck reactor equipped with a thermometer and thermo-watch and purged with nitrogen was added 5 g (0.0025 mole) of polyethyleneadipate diol (PEA 2000). The reactor was then placed in a 160° C. silicone bath, and the reactants reached the bath temperature in about 15 minutes. At this temperature, the reactants were stirred for 2.5 hours with an air driven stainless steel propeller to complete the end-capping step. To the reactor content was added 80 g of dimethyl formamide (DMF), and the temperature was allowed to drop. After all the reaction content was dissolved, the temperature was lowered to about −15° C. by the use of a dry ice-isopropanol bath. To this reactor content was added 0.495 g (0.0025 mole) of methylene dianiline (MDA) in 5 g DMF solution all at once. The reactor content was stirred and kept at −15° C. Additional 20 g DMF at −15° C. was added gradually to the reactor content to keep up with the viscosity increase of the solution, which indicated the chain-extension reaction. Then, the solution containing the copolymer with the polyamic acid hard segment and the polyadipate soft segment was allowed to reach room temperature. To this solution was added 0.7 g (0.005 mole) diepoxycyclooctane and the mixture was stirred for 40 minutes.

The resulting solution was centrifuged for about 5 minutes. Following centrifugation, two pieces of the membrane were knife-cast onto a porous Gore-tex® teflon support with a pore size of about 0.2 micron and a porosity of about 80% by the use of a knife gap setting of 31 mils. DMF was allowed to evaporate from the membrane in a box purged with nitrogen in a hood at room temperature for 12 hours. The membrane was then dried in an oven at 120° C. for about 24 hours. Finally, the membrane was cured, by heating it from room temperature to 310° C., maintaining it at this temperature for 144 minutes and then cooling it to room temperature in the curing step, to obtain the diepoxycyclooctane crosslinked/esterified PEI membrane. The two pieces of the resulting membrane had 7.1 and 6.6 microns in thickness.

EXAMPLE 2

Figure 2:
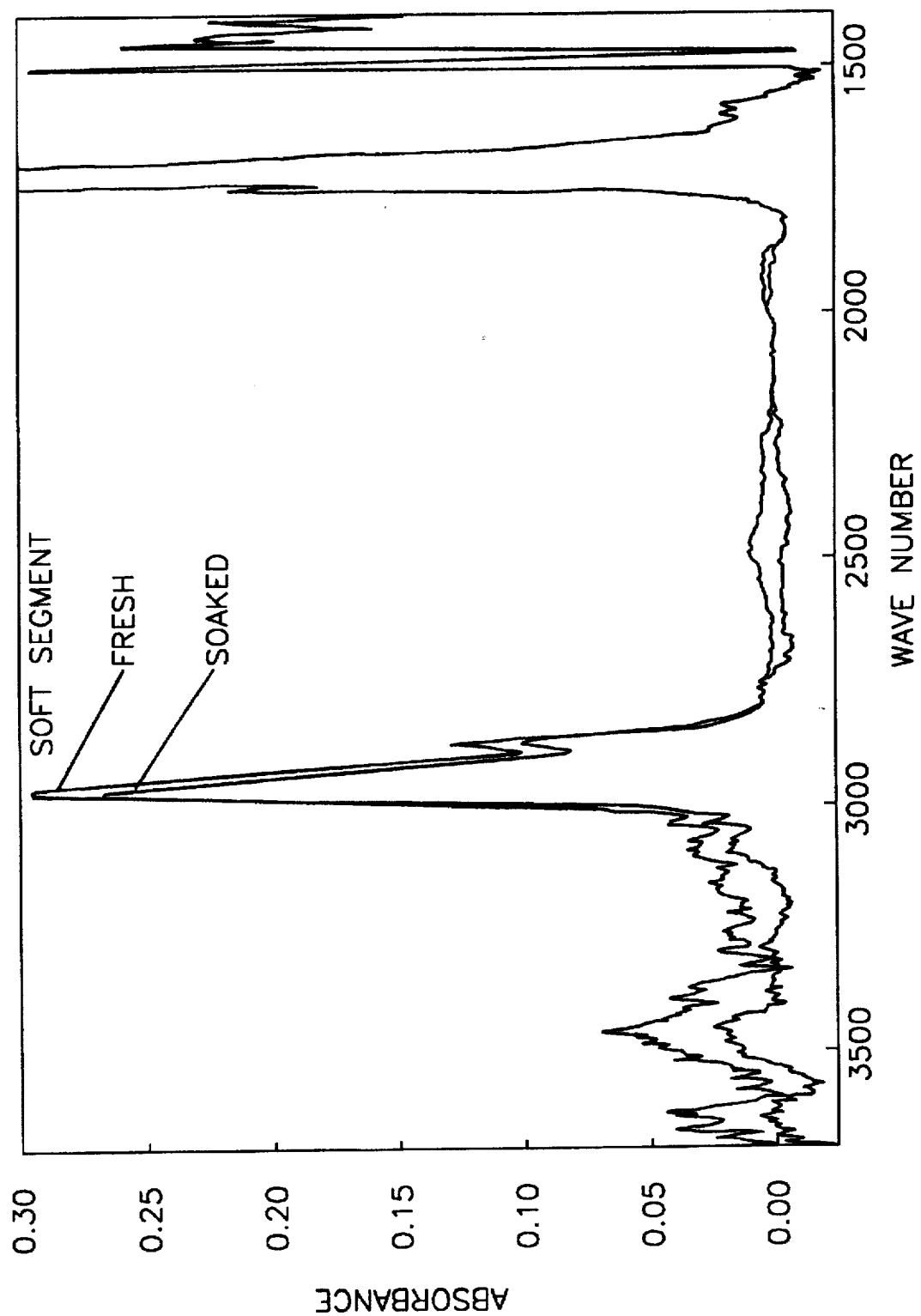
FIG. 2 Shows infrared spectroscopy detected no significant composition change between a fresh, diepoxycyclooctane crosslinked polyimide-polyester membrane (diepoxycyclooctane PEI) and the same membrane after a soaking experiment.

Pervaporation results for Diepoxycyclooctane Crosslinked/Esterified Polyimide-Polyadipate Copolymer (Diepoxycyclooctane PEI) Membrane The piece of the resulting membrane with a thickness of 7.1 microns described in Example 1 was soaked in a feed mixture of 50 wt. % mesitylene and 50 wt. % n-decane at 140° C. for 3.3 days. This soaked membrane and the other piece of the resulting membrane with a thickness of 6.6 microns, which was described in Example 1 and not soaked, were evaluated for aromatic/saturate separation with the same feed mixture also at 140° C. in the pervaporation apparatus described above. The mesitylene/n-decane separation factors and fluxes were 4.2 and 1100 kg.µm/m$^2$/day for the soaked membrane and 4.0 and 1160 kg./µm/m$^2$/day for the fresh, unsoaked membrane, respectively. Both the soaked and fresh membranes performed very well for the separation. In other words, the membrane was stable in soaking with the feed. As shown in FIG. 2, IR detected no significant composition change between the fresh and soaked membranes.

EXAMPLE 3

Synthesis of Diepoxyoctane Crosslinked/Esterified Polyimide-Polyadipate Copolymer (Diepoxyoctane PEI) Membrane The synthesis procedure was similar to that described in Example 1 except the stirring time used for the diepoxide addition was 20 minutes instead of 40 minutes and the curing condition was 320° C. for 90 minutes instead of 310° C. for 144 minutes. Both pieces of the resulting membrane had a thickness of about 6.9 microns each.

EXAMPLE 4

Pervaporation Results for Diepoxyoctane Crosslinked/Esterified Polyimide-Polyadipate Copolymer (Diepoxyoctane PEI) Membrane One piece of the resulting membrane with a thickness of about 6.9 microns described in Example 3 was soaked in the same way described in Example 2, i.e., in a feed mixture of 50 wt. % mesitylene and 50 wt. % n-decane at 140° C. for 3.3 days. This soaked membrane and the other piece of the resulting membrane also with a thickness of about 6.9 microns, which was described in Example 3 and not soaked, were evaluated for aromatic/saturate separation in the same way described in Example 2., The mesitylene/n-decane separation factors and fluxes were 4.2 and 950 kg.µm/m$^2$/day for the soaked membrane and 4.2 and 1100 kg.µm/m$^2$/day for the fresh, unsoaked membrane. Both the soaked and fresh membranes performed quite well for the separation.

EXAMPLE 5

Comparative Data vs. Polyimide-Polyadipate Copolymer (PEI) Membrane

Two pieces of the polyimide-polyadipate copolymer (PEI) membrane covered in our U.S. Pat. Nos. 4,944,880 and 4,990,275 were synthesized in the same procedure described in Example 1 except no diepoxide was added and the curing was carried out under the typical PEI condition of 260° C. for 9 minutes. The resulting membrane had a thickness of about 11.2 microns. One piece of the membrane was soaked, in the same way described in Example 2, in the feed at 140° C. for 4 days. Then, this soaked membrane and the fresh, unsoaked membrane were evaluated for aromatic/saturate separation in the same way as described in Example 2. The mesitylene/n-decane separation factors and fluxes were 1.5 and 350 kg.μm/m²/day for the soaked membrane and 4.2 and 1200 kg.μm/m²/day for the fresh membrane. The soaked membrane performed much poorer than the fresh membrane. In other words, the PEI membrane was not stable in the soaking.

Table 1 summarizes the separation results of the PEI membrane for comparison with those described in Examples 2 and 4. As shown in this table, the diepoxide PEI membranes have exhibited much better soaking stability than the PEI membrane (without a diepoxide).

Figure 3:
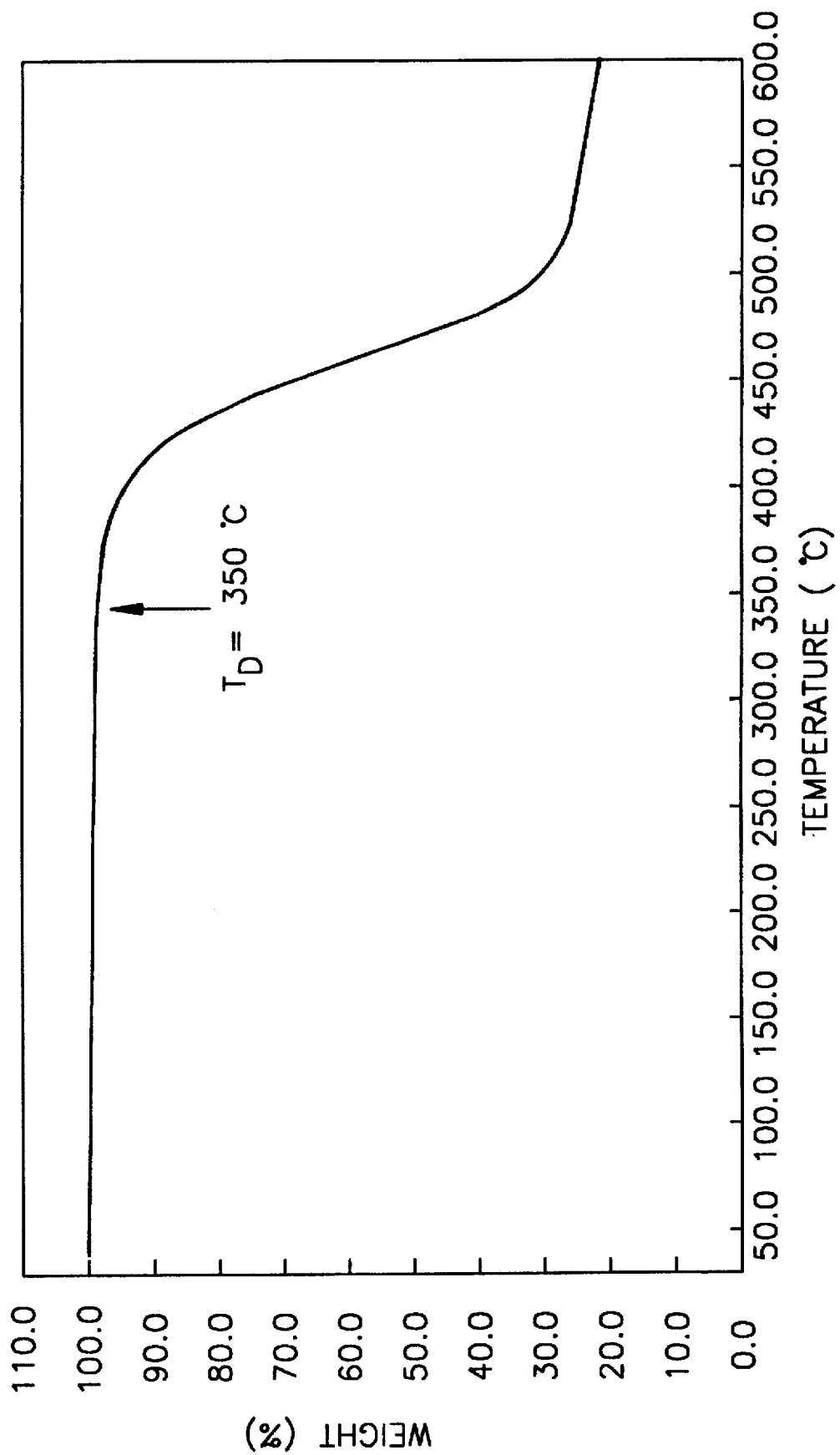
FIG. 3&4 Show that reaction of a polyamic acid-polyester copolymer with a diepoxide leads to an improved thermal stability.
Figure 4:
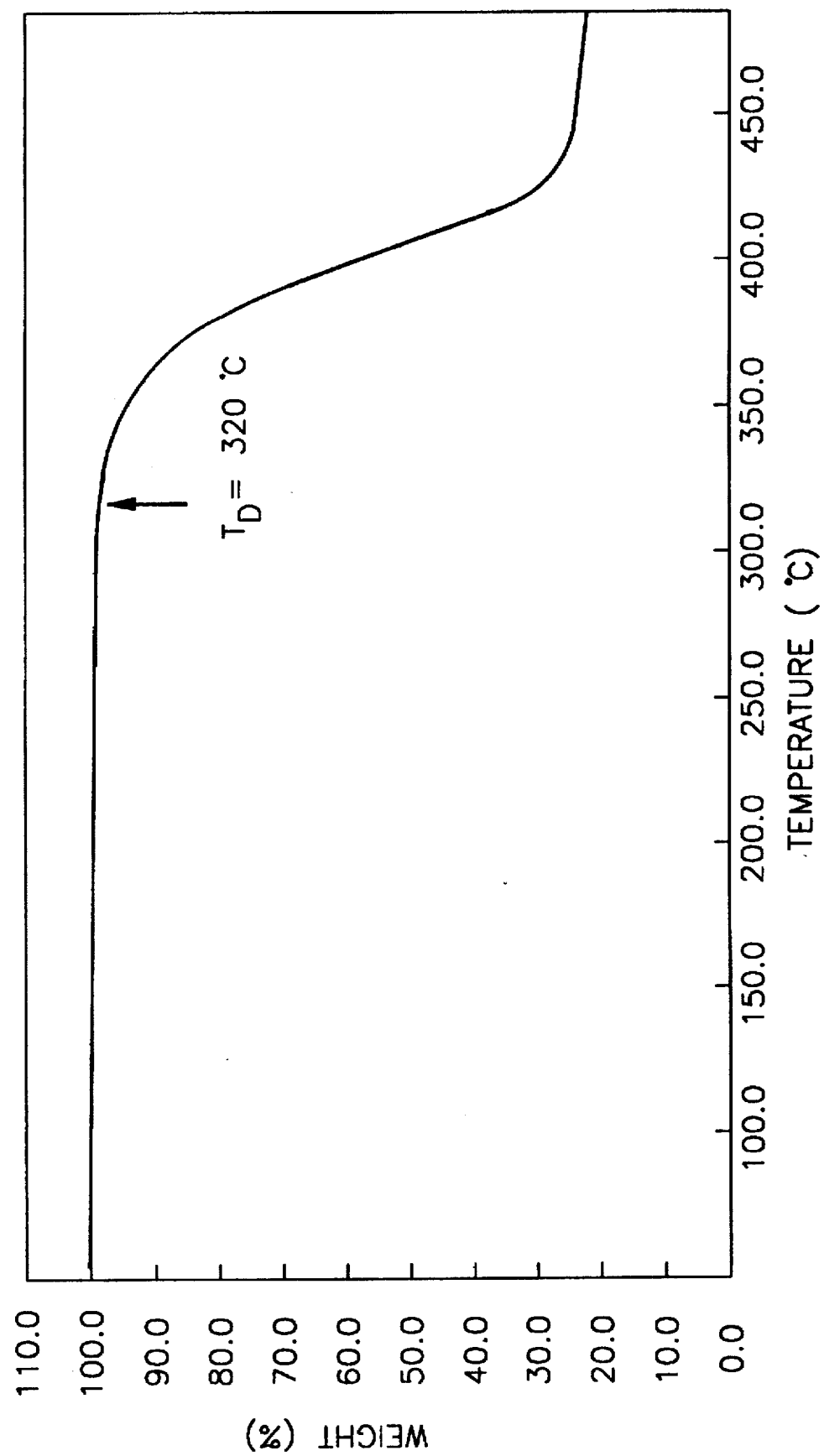

Thermogravimetric analysis showed the diepoxycyclooctane PEI membrane with higher thermal decomposition temperature ($T_D$) than the PEI membrane. As shown in FIG. 3. The $T_D$ for the diepoxide PEI membrane was 350° C. FIG. 4 shows a $T_D$ of 320° C. for the PEI membrane without a diepoxide.

Figure 5:
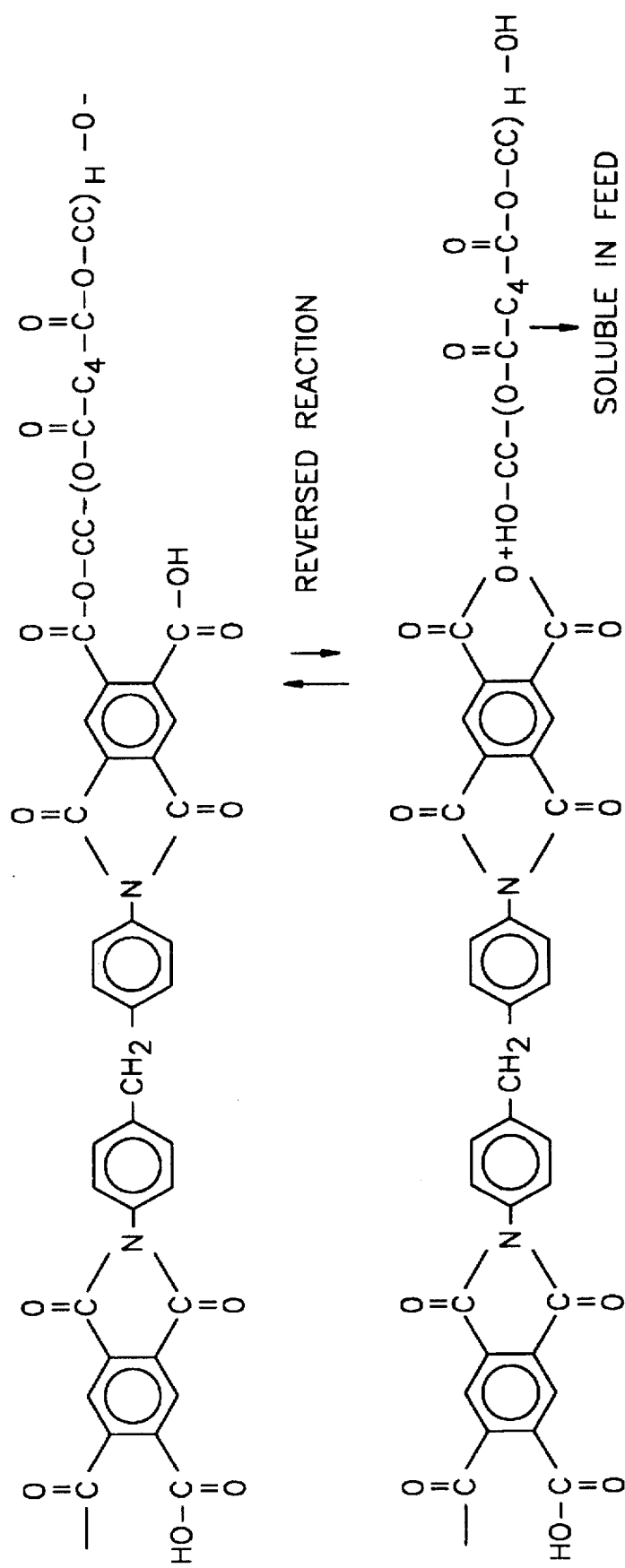
FIG. 5 Shows a possible mechanism of degradation of a polyimide-polyester copolymer due to the presence of free carboxylic acid groups.

The poor soaking stability of the PEI membrane is presumably due to reversible reaction via the pendent carboxylic acid groups adjacent to the ester linkages between the polyimide hard segments and polyadipate soft segments as shown in FIG. 5. Since the reaction product, the polyadipate diol (soft segment), is soluble in the feed, it is then lost into the bulk of the feed during the soaking. Presumably, the reaction is eliminated when the pendent carboxylic acid groups are converted to the ester groups via crosslinking and esterification with a diepoxide. Thus, the diepoxide PEI membranes have much better soaking stability than the PEI membrane without a diepoxide.

TABLE 1

DIEPOXIDE PEIs SHOWED GOOD SOAKING STABILITY

| Membrane | Curing Condition | Days in Soaking* | Mesitylene/ n-Decane Separation Factor* | Flux* (Kg · μM/ M²/D) |
|---|---|---|---|---|
| PEI | 260° C./9 min | 0 | 4.2 | 1200 |
| | | 4 | 1.5 | 350 |
| Diepoxyoctane PEI | 320° C./90 min | 0 | 4.2 | 1100 |
| | | 3.3 | 4.2 | 950 |
| Diepoxycyclo- octane PEI | 310° C./144 min | 0 | 4.0 | 1160 |
| | | 3.3 | 4.2 | 1100 |

*At 140° C.

What is claimed is:

1. A process for the separation of aromatics from non-aromatics by selectively permeating the aromatics through a thin membrane including a copolymer comprising a diepoxide crosslinked/esterified polyimide-aliphatic polyester copolymer comprising hard polyimide segments having a glass-transition temperature (Tg) higher than 130° C. and soft polyester segments having a Tg lower than that of the hard segments wherein, said copolymer is cross-linked through the carboxylic acid group adjacent to the ester.

2. The process of claim 1 wherein said copolymer comprises the hard segment of a polyimide, the soft segment of an oligomeric aliphatic polyester, and a diepoxide for crosslinking and esterification, wherein said polyimide is derived from a dianhydride having between 8 and 20 carbons and a diamine having between 2 and 30 carbons, said oligomeric aliphatic polyester is a polyadipate, a polysuccinate, a polymalonate, a polyoxalate or a polyglutarate, and said diepoxide is diepoxyoctane, diepoxycyclooctane, diepoxybutane, bisphenol-A diglycidyl ether, or 1,4-butanediol diglycidyl ether.

3. The process of claim 2 wherein said dianhydride of said copolymer includes an aromatic compound.

4. The process of claim 2 wherein said diamine is selected from the group consisting of phenylene diamine, methylene dianiline (MDA), methylene di-o-chloroaniline (MOCA), methylene bis(dichloroaniline), methylene dicyclohexylamine, methylene dichlorocyclohexylamine, methylene bis(dichlorocyclohexylamine), 4,4'-(hexafluoroisopropylidene)-bisaniline, 3,3'-diaminodiphenyl sulfone, 4,4'-diaminophenyl sulfone, 4,4'-dimethyl-3,3'-diaminodiphenyl sulfone, 3,4-diamino cumene, methylene bis(di-o-toluidine), oxydianiline, bisaniline A, bisaniline M, bisaniline P, thiodianiline, 2,2-bis[4-(4-aminophenoxy) phenyl] propane, bis[4-(4aminophenoxy) phenyl] sulfone, 4,4'-bis-(4-aminophenoxy) biphenyl, 1,4-bis(4-aminophenoxy) benzene, and 1,3-bis(4-aminophenoxy) benzene.

5. The process of claim 3 wherein said aromatic compound is selected from the group consisting of pyromellitic dianhydride, 3,3',4,4'-benzophenone tetracarboxylic dianhydride, 4,4'-(hexafluoroisopropylidene)-bis(phthalic anhydride), 4,4'-oxydiphthalic anhydride, diphenylsulfone-3,3',4,4'-tetracarboxylic dianhydride, and 3,3',4,4'-biphenyltetracarboxylic dianhydride.

6. The process of claim 2 wherein said polyester is polyethylene adipate.

7. The process of claim 2 wherein said polyester is polyethylene succinate.

8. The process of claim 2 wherein said diamine is methylene dianiline or methylene di-o-chloroaniline.

9. The process of claim 2 wherein the diepoxide is diepoxyoctane or diepoxycyclooctane.

* * * * *